United States Patent
Cederwall et al.

(10) Patent No.: US 12,459,348 B2
(45) Date of Patent: Nov. 4, 2025

(54) MOBILE ROBOT DRIVE SYSTEM

(71) Applicant: OMRON Corporation, Kyoto (JP)

(72) Inventors: Kevin Cederwall, Walnut Creek, CA (US); Pete Cardamone, Brentwood, CA (US); Seth Dunten, Castro Valley, CA (US); Ali Jabbari, Berkeley, CA (US); Azharuddin Khaderi, Dublin, CA (US)

(73) Assignee: OMRON Corporation, Kyoto (JP)

( * ) Notice: Subject to any disclaimer, the term of this patent is extended or adjusted under 35 U.S.C. 154(b) by 397 days.

(21) Appl. No.: 17/754,478

(22) PCT Filed: Oct. 13, 2020

(86) PCT No.: PCT/US2020/055417
§ 371 (c)(1),
(2) Date: Apr. 1, 2022

(87) PCT Pub. No.: WO2021/076519
PCT Pub. Date: Apr. 22, 2021

(65) Prior Publication Data
US 2024/0042845 A1    Feb. 8, 2024

Related U.S. Application Data

(60) Provisional application No. 62/914,943, filed on Oct. 14, 2019.

(51) Int. Cl.
*B60K 7/00* (2006.01)
*B60G 3/14* (2006.01)
(Continued)

(52) U.S. Cl.
CPC .............. *B60K 7/0007* (2013.01); *B60G 3/14* (2013.01); *B60G 7/001* (2013.01); *B60K 17/043* (2013.01);
(Continued)

(58) Field of Classification Search
CPC ................ B60K 7/0007; B60K 17/043; B60K 2007/0084; B60K 2007/0038; B60G 3/14;
(Continued)

(56) References Cited

U.S. PATENT DOCUMENTS 5,446,445 A * 8/1995 Bloomfield ............ G08B 25/10
340/539.22
8,360,178 B2 * 1/2013 Goldenberg ......... B62D 57/024
180/9.1

(Continued)

FOREIGN PATENT DOCUMENTS

AU      2017323648      3/2019
CN       105142478      12/2015
(Continued)

OTHER PUBLICATIONS

Translation of KR-20240057056-A.*
(Continued)

*Primary Examiner* — Paul N Dickson
*Assistant Examiner* — Shams Dhanani
(74) *Attorney, Agent, or Firm* — Knobbe, Martens, Olson & Bear, LLP

(57) ABSTRACT

A mobile robot can include a chassis and support wheels configured to support the chassis on a ground surface. The mobile robot can have a drive assembly that includes a drive wheel mounted to a control arm for moving the mobile robot. The control arm can pivot about a pivot axis. The pivot axis can be rearward of the axis of rotation of the drive wheel. The pivot axis can be lower than the axis of rotation of the drive wheel. The pivot axis can be lower than the axis of rotation for one or more of the support wheels. A biasing member can bias the control arm downward. Braking using the drive wheel can increase the force of the drive wheel (Continued)

against the ground. Accelerating using the drive wheel can decrease the force of the drive wheel against the ground.

18 Claims, 15 Drawing Sheets

(51) Int. Cl.
  B60G 7/00 (2006.01)
  B60K 17/04 (2006.01)
  B62D 61/10 (2006.01)
(52) U.S. Cl.
  CPC ........ B62D 61/10 (2013.01); *B60G 2800/162* (2013.01); *B60K 2007/0084* (2013.01)
(58) Field of Classification Search
  CPC .. B60G 7/001; B60G 2800/162; B62D 61/10; B62D 63/02; B66F 9/063; G05D 1/024; B60Y 2200/80
  See application file for complete search history.

(56) References Cited

U.S. PATENT DOCUMENTS

| | | | | |
|---|---|---|---|---|
| 2003/0075365 A1* | 4/2003 | Fought | ................... | A61G 5/043 180/6.5 |
| 2016/0000282 A1 | 1/2016 | Vanderstegen-Drake et al. | | |
| 2017/0080846 A1* | 3/2017 | Lord | ................... | B60K 7/0007 |
| 2018/0056985 A1* | 3/2018 | Coulter | ................... | B60L 50/52 |
| 2018/0072212 A1* | 3/2018 | Alfaro | ................. | B60P 1/52 |
| 2018/0076701 A1* | 3/2018 | Hunter | .................. | H02K 7/075 |
| 2019/0077212 A1* | 3/2019 | Imaoka | ............. | B60G 17/0161 |
| 2022/0363329 A1* | 11/2022 | Jensen | ................... | B62D 61/10 |

FOREIGN PATENT DOCUMENTS

| | | |
|---|---|---|
| CN | 108890613 | 11/2018 |
| JP | 2016-159389 | 9/2016 |
| KR | 2005-0031082 A | 4/2005 |
| KR | 2007-0070658 | 7/2007 |
| KR | 20240057056 A * | 5/2024 |
| WO | WO 2021/076519 A1 | 4/2021 |

OTHER PUBLICATIONS

Extended European Search Report for EP Application No. 20875907.6, dated Nov. 3, 2023, in 6 pages.
International Search Report and Written Opinion for PCT Application No. PCT/US2020/055417 dated Feb. 17, 2021 in 19 pages.
Office Action in Korean Patent Application No. 10-2022-7008890, dated Sep. 5, 2023, in 22 pages.
Notice of Reasons for Refusal in JP Application No. 2022-520131 dated Feb. 21, 2023 in 6 pages.

* cited by examiner

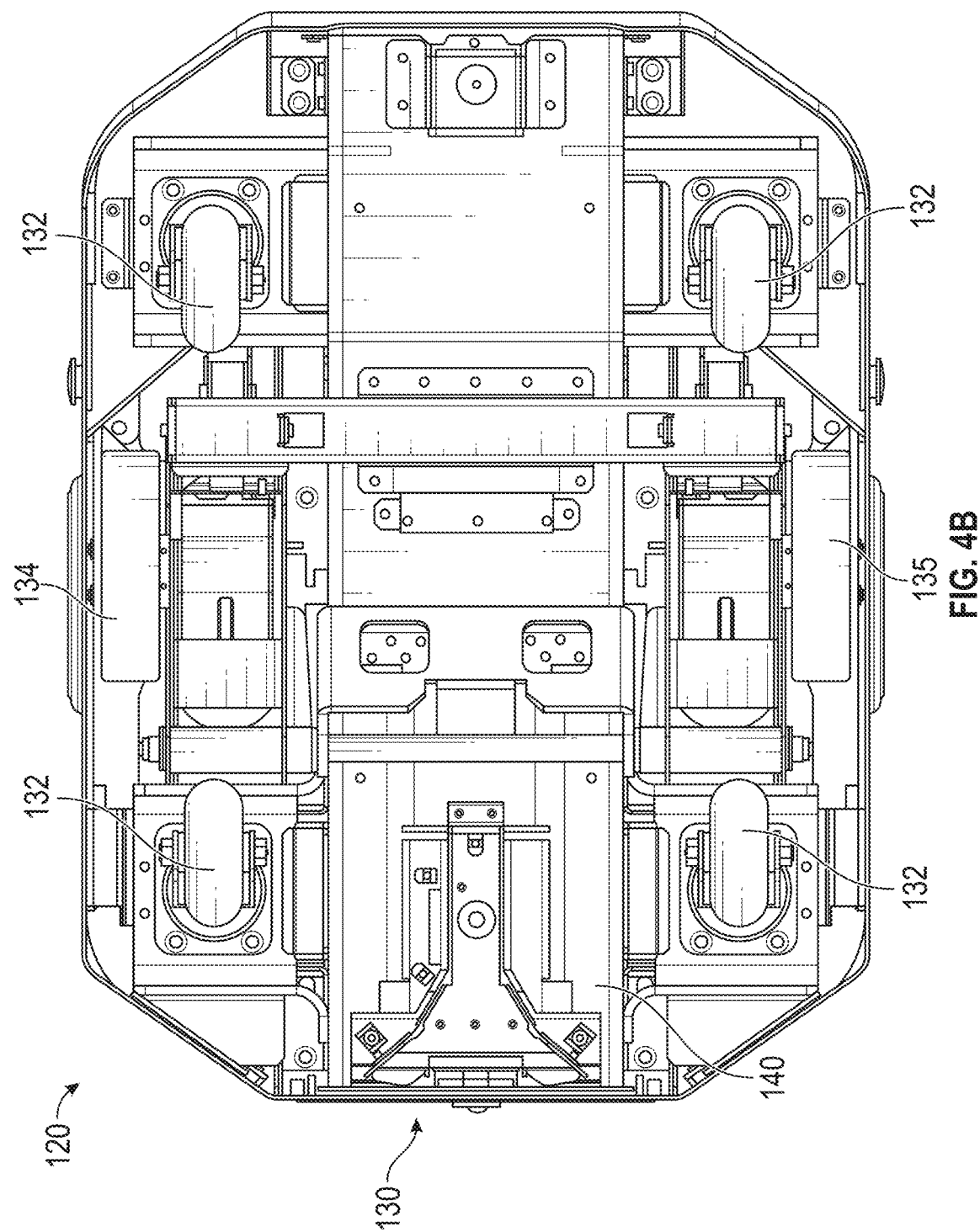

MOBILE ROBOT DRIVE SYSTEM

CROSS-REFERENCE TO RELATED APPLICATIONS

The is a national phase application of PCT Application No. PCT/US2020/055417, filed Oct. 13, 2020, which claims the benefit of U.S. Provisional Patent Application No. 62/914,943, filed Oct. 14, 2019, and titled MOBILE ROBOT DRIVE SYSTEM. The entire contents of each of the above-identified application(s) are hereby incorporated by reference herein and made part of this specification for all that they disclose.

BACKGROUND

Field

This disclosure generally relates to drive systems such as for mobile robots, and in some instances to improved suspension systems for engaging a drive wheel with a ground surface.

Related Art

Mobile robots are used in many different industries to automate tasks typically performed by humans. Mobile robots can be autonomous or semi-autonomous and designed to operate within a specified area and complete, or assist humans in the completion of, industrial tasks. In one example, a mobile robot is a mobile robotic platform that can be used in a warehouse or other industrial setting to move and arrange materials through interaction with other cart accessories, robotic arms, conveyors and other robotic implementations. Each mobile robot can include its own autonomous navigation system, communication system, and drive components.

SUMMARY

One aspect of the present disclosure is a support system for a mobile robot. The mobile robot can include a chassis that supports an upper platform. The chassis can be supported by four fixed wheels that support the chassis on a ground surface. A load on the upper platform or chassis can be distributed through the four fixed support wheels. In certain implementations, the four fixed wheels do not provide any driving or braking force for the mobile robot. Instead, the mobile robot can include a drive assembly that engages with the ground surface for accelerating and decelerating the mobile robot. In some embodiments, one or more fixed wheels do not move up and down (e.g., to provide a constant ground clearance height), although in some cases the one or more fixed wheels can move in other directions. For the example, the one or more fixed wheels can be on casters (e.g., which can facilitate turning of the mobile robot).

In another aspect of the present disclosure, the drive assembly can include a suspension system and a drive wheel. The suspension system engages the drive wheel with the ground surface in a manner that is independent of the load on the upper platform.

In another aspect of the present disclosure, the suspension system for the drive assembly can include a control arm that is pivotably coupled with the chassis at a pivot location. The pivot location can be at a height above the ground surface. The height can control the engagement of the drive wheel with the ground surface during acceleration and deceleration. By adjusting the height of the pivot location, the suspension system can provide a desirable balance between acceleration and decelerating. The control arm can be generally aligned along a forward-rearward direction for the mobile robot. The drive wheel can be coupled with the control arm at a location forward of the pivot location of the control arm. A pivot axis of the control arm can be generally parallel with the rotation axis of the drive wheel. As the mobile robot accelerates or decelerates, the drive wheel exerts a drive force on the ground surface that creates a moment on the control arm about the pivot location. The moment can decrease or increase frictional engagement between the drive wheel and the ground surface, depending on the direction of forces on the drive wheel (e.g., from accelerating or decelerating). Increased frictional engagement can provide additional braking power or acceleration power. Decreased frictional engagement can provide decreased braking power or acceleration power. During deceleration, the moment can increase a drive load on the drive wheel and thereby provide an improved braking performance. During acceleration the moment can decrease the drive load on the drive wheel and thereby provide a decreased acceleration power. In some instances, the drive load can be decreased enough to result in the drive wheel spinning out and a lack of acceleration of the mobile robot. By adjusting the height of the pivot location above the ground surface to a low position on the chassis, a balance between the braking power and the acceleration power through the engagement of a drive wheel with the ground surface can be achieved. By way of example, a low pivot location can result in improved braking performance, without compromising the acceleration capabilities of the system.

Various embodiments disclosed herein can relate to a mobile robot, which can include a chassis, a support system that includes at least three support wheels configured to support the chassis on a ground surface, and a drive system including a first drive assembly coupled with the chassis and configured to accelerate the mobile robot across the ground surface. The first drive assembly can include a control arm having a first end. The first end can be pivotally coupled with the chassis at a pivot location. A biasing member can have an upper end and a lower end. The lower end can be coupled with the chassis at a connection location and the upper end can be coupled with the control arm at a distance spaced from the first end. The mobile robot can have a drivetrain that includes a drive shaft and a motor mounted on the control arm. The mobile robot can have a drive wheel mounted on the drive shaft. The drive wheel can be aligned along a forward-reverse direction of the mobile robot and can be rotatable about an axis aligned along a lateral direction that is generally orthogonal to the forward-reverse direction. The control arm can be generally aligned along the forward-reverse direction and the connection location can be located forward of the pivot location.

The biasing member can be configured to bias the drive wheel to a disengaged configuration such that when the mobile robot is placed on the ground surface, the drive wheels exerts an engagement force on the ground surface based on a position of the biasing member. A load on the mobile robot can be supported by the chassis through the support system, and an engagement force exerted by the first drive assembly against the flat surface can be independent of the load. Braking using the drive wheel can increase the engagement force between the drive wheel and the ground surface. Accelerating forward using the drive wheel can decrease the engagement force between the drive wheel and the ground surface. An axis of the pivot location can be located below the connection location. An axis of the pivot location can be located below an axis of the drive shaft. The at least three support wheels can each include respective axles, and an axis of the pivot location can be located below each of the axles of the support wheels. The pivot location can be the lowest elevation point or component on the chassis. The pivot location can be aligned with the control arm and the connection location in the forward-reverse direction. The drive wheel can be offset from the control arm in the lateral direction. The biasing member can include a spring. The support system can include first, second, third, and fourth support wheels. The support system can include caster wheels. A pivot axis of the control arm can be generally parallel with an axis of rotation of the drive wheel. A second end of the control arm can move in a generally vertical direction between a disengaged configuration and an engaged configuration. The drivetrain can include a worm gear and worm wheel. The robot can include a second drive assembly on an opposite side of the chassis as the first drive assembly. The first drive assembly and the second drive assembly can be mounted on a single axle coupled with the chassis.

Various embodiment disclosed herein can relate to a mobile robot, which can include a chassis, a support system with support wheels configured to support the chassis on a ground surface, and a drive system with a first drive assembly coupled with the chassis and configured to accelerate the mobile robot across the ground surface. The first drive assembly can include a control arm pivotally coupled with the chassis at a pivot location. A biasing member can be coupled with the control arm and the chassis. A drive wheel can be mounted on the control arm. The drive wheel can be aligned along a forward-reverse direction of the mobile robot and can be rotatable about an axis aligned along a lateral direction that is generally orthogonal to the forward-reverse direction. A motor can be included for driving the drive wheel. The biasing member can be configured to bias the drive wheel to a second elevation below the first elevation such that when the mobile robot is placed on the flat surface, the drive wheel exerts an engagement force on the flat surface based on a position of the biasing member.

A load on the mobile robot can be supported by the chassis through the at least three support wheels. An engagement force exerted by the first drive assembly against the ground surface can be independent of the load. Braking using the drive wheel can increase the engagement force between the drive wheel and the ground surface. Accelerating forward using the drive wheel can decrease the engagement force between the drive wheel and the ground surface. The pivot location can be located below a connection of the biasing member with the chassis. The pivot location can be located below a drive shaft. The at least three support wheels can each include respective axles, and the pivot location can be located below each of the axles. The pivot location can be the lowest elevation point or component on the chassis.

Various embodiments disclosed herein can relate to a mobile robot, which can include a chassis, a support system including support wheels configured to support the chassis on a ground surface, and a first drive assembly coupled with the chassis and configured to move the mobile robot. The first drive assembly can include a control arm pivotally coupled with the chassis at a pivot location and a drive wheel mounted on the control arm. A load on the mobile robot can be supported by the chassis through the support wheels, and an engagement force exerted by the first drive assembly against the flat surface can be independent of the load.

The mobile robot can include a biasing member configured to bias the drive wheel downward. The control arm can be generally aligned along the forward-reverse direction. Braking using the drive wheel can increase the engagement force between the drive wheel and the flat surface. Accelerating forward using the drive wheel can decrease the engagement force between the drive wheel and the flat surface. The pivot location can be located below a connection of the biasing member with the chassis. The pivot location can be located below a drive shaft of the drive wheel. The pivot location can be located rearward of a drive shaft of the drive wheel. The support wheels can each include respective axles, and the pivot location can be located below each of the axles. The pivot location can be the lowest elevation point or component on the chassis.

Various embodiments disclosed herein can relate to a mobile robot, which can include a chassis and at least one drive assembly, which can be coupled with the chassis and configured to move the mobile robot. The drive assembly can include a drive wheel configured to rotate about a drive wheel axis and a control arm supporting the drive wheel. The control arm can be coupled to the chassis at a pivot location with a pivot axis that is generally parallel to the drive wheel axis. A motor can be configured to rotate the drive wheel.

The pivot location of the control arm can be rearward of the drive wheel axis. The pivot location of the control arm can be lower than the drive wheel axis. The drive assembly can be biased downward. The mobile robot can include a plurality of support wheels. A load on the mobile robot can be supported by the chassis through the support wheels, so that an engagement force exerted by the first drive assembly against the ground surface can be independent of the load.

Various embodiments disclosed herein can relate to a mobile robot, which can include a chassis and at least one drive assembly coupled with the chassis and configured to move the mobile robot. The drive assembly can include a drive wheel configured to rotate about a drive wheel axis and a motor configured to rotate the drive wheel. The drive wheel can be configured to pivot about a pivot axis rearward of the drive wheel.

The mobile robot can include undriven support wheels to support the chassis on a ground surface. The weight of the mobile robot can be supported through the support wheels so that an engagement force exerted by drive wheel against the ground surface is independent of the weight of the mobile robot. The pivot axis can be below the axis of rotation of one or more of the support wheels. The pivot axis can be below the axis of rotation of the drive wheel. The pivot axis can be substantially parallel to the axis of rotation of the drive wheel. Accelerating forward using the drive wheel can decrease the engagement force of the drive wheel against the ground. Braking using the drive wheel can increase the engagement force of the drive wheel against the ground.

The foregoing summary is illustrative only and is not intended to be limiting. Other aspects, features, and advantages of the systems, devices, and methods and/or other subject matter described in this application will become apparent in the teachings set forth below. The summary is provided to introduce a selection of some of the concepts of this disclosure. The summary is not intended to identify key or essential features of any subject matter described herein.

BRIEF DESCRIPTION OF THE DRAWINGS

Various examples are depicted in the accompanying drawings for illustrative purposes, and should in no way be

FIG. 4B shows a bottom view of the mobile robot.

DETAILED DESCRIPTION

The various features and advantages of the systems, devices, and methods of the technology described herein will become more fully apparent from the following description of the examples illustrated in the figures. These examples are intended to illustrate the principles of this disclosure, and this disclosure should not be limited to merely the illustrated examples. The features of the illustrated examples can be modified, combined, removed, and/or substituted as will be apparent to those of ordinary skill in the art upon consideration of the principles disclosed herein.

The present disclosure relates to a support system for a mobile robot. The support system can include support wheels that support a chassis of the mobile robot on a ground surface. A load on the chassis can be distributed through the support wheels. The mobile robot can also include a drive assembly. The drive assembly can include a suspension system for engaging a drive wheel with the ground surface for acceleration and/or braking. The suspensions system engages the drive wheel with the ground surface in a manner that is independent of the load on the upper platform.

Figure 1A:
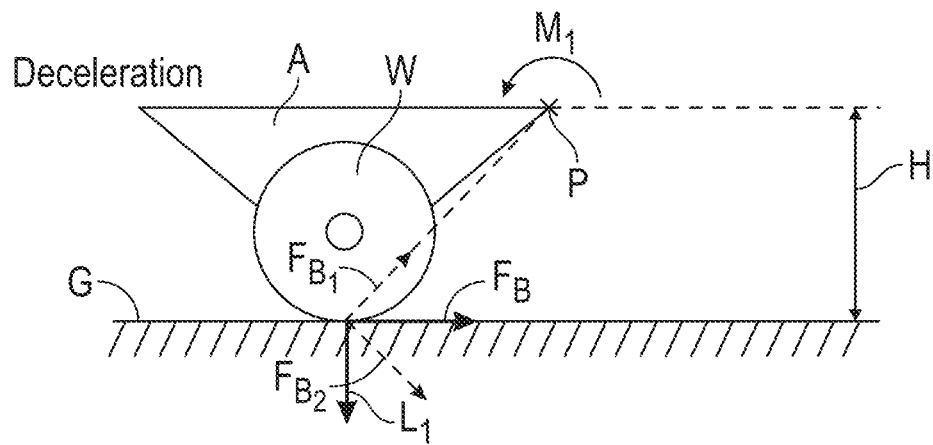
FIGS. 1A-B show a moment on a drive assembly during braking.

FIG. 1A shows a schematic representation of the drive assembly including a control arm A pivotably mounted (e.g., with the chassis of a mobile robot) at a pivot location P. A drive wheel W is mounted on the control arm A. The drive wheel W can engage with a ground surface G to provide deceleration. The pivot location P can be at height H above the ground surface G.

During braking using the drive wheel W, the ground surface G can exert a braking force $F_B$ on the drive wheel W and the control arm A. The braking force $F_B$ can exert a moment $M_1$ about the pivot location P. The braking force $F_B$ can include an inline force component $F_{B1}$ that acts in line with the direction towards the pivot location P and an orthogonal force component $F_{B2}$ that is orthogonal to the direction towards pivot location P.

The braking force $F_B$ (e.g., specifically the orthogonal force component $F_{B2}$ acting through the drive wheel W and the control arm A) creates a moment $M_1$ about the pivot location P. The moment $M_1$ created by the braking force $F_B$ can increase a drive load $L_1$ from the drive wheel W into the ground surface G. The drive load $L_1$ can be a normal force that can include weight or other biasing force on the control arm A and the drive wheel W in the direction of the ground surface G. The drive load $L_1$ can increase as a result of the moment $M_1$, so that the frictional engagement between the drive wheel W and the ground surface G, which can increase braking power.

Figure 1B:
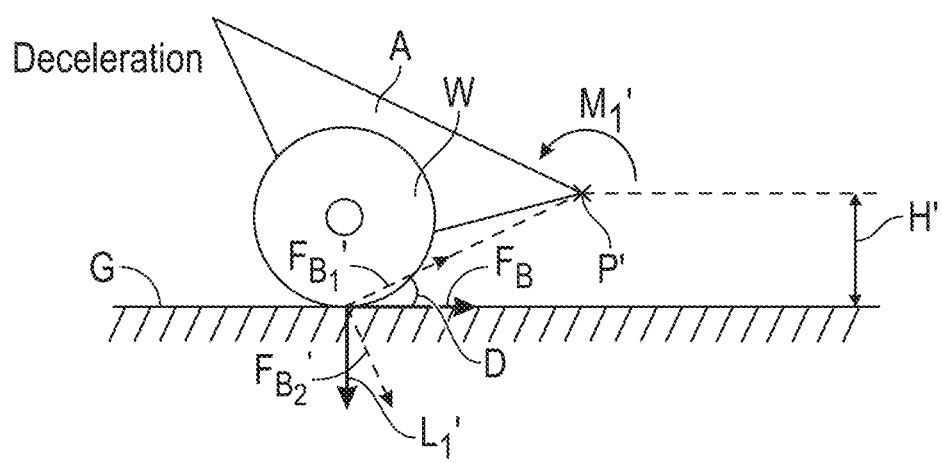

FIG. 1B shows the drive assembly with an adjusted configuration, which can be different from the drive assembly of FIG. 1A as discussed herein. The pivot location P' can be at a height H'. Height H' can be lower than the height H in FIG. 1A. During braking of the drive wheel W, the ground surface G can exert the braking force $F_B$ on the drive wheel W and the control arm A. The braking force $F_B$ can exert a moment $M_1'$ about the pivot location P'. The braking force $F_B$ can include an inline force component $F_{B1}'$ that acts in line with the direction towards the pivot location P' and an orthogonal force component $F_{B2}'$ that is orthogonal to the direction towards the pivot location P'.

The orthogonal force component $F_{B2}'$ creates the moment $M_1'$ and the drive load $L_1'$. Because the height H' of the pivot location P' is lower than the height H on the pivot location P, the force $F_{B2}'$ can be less than the force $F_{B2}$ and the drive load $L_1'$ can be less than the drive load $L_1$. Thus, even for the same braking force $F_B$ the moment $M_1'$ can be proportionately less than $M_1$ based on the difference between the height H' and the height H. As the height H is decreased towards the ground surface G, braking the drive wheel W can be more difficult and can lead to skidding and/or longer braking distances.

Figure 1C:
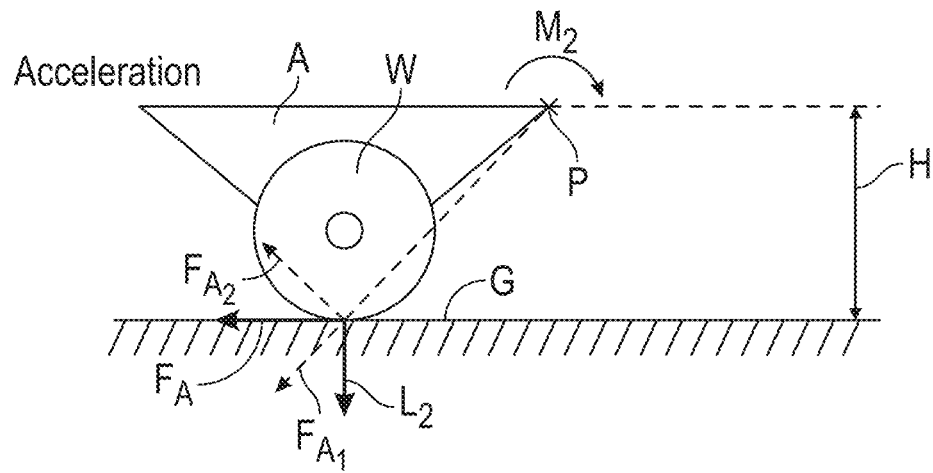
FIGS. 1C-D show a moment on a drive assembly during acceleration.

FIG. 1C shows a schematic representation of the drive assembly including the control arm A pivotably mounted at the pivot location P. The drive wheel W is mounted on the control arm A. The drive wheel W can engage with a ground surface G to provide acceleration. The pivot location P can be at the height H above the ground surface G (e.g., similar to FIG. 1A).

During acceleration of the drive wheel W, the ground surface G can exert an acceleration force $F_A$ on the drive wheel W and the control arm A. The acceleration force $F_A$ can exert a moment $M_2$ about the pivot location P. The acceleration force $F_A$ can include an inline force component $F_{A1}$ that acts in line with the direction towards the pivot location P and an orthogonal force component $F_{A2}$ that is orthogonal to the direction towards the pivot location P.

The acceleration force $F_A$ creates the moment $M_2$ about the pivot location P (e.g., specifically the orthogonal force component $F_{A2}$ acting through the drive wheel W and the control arm A). The moment $M_2$ created by the acceleration force $F_A$ can decrease a drive load $L_2$ from the drive wheel W into the ground surface G. The drive load $L_2$ can be a normal force that can include weight or other biasing force on the control arm A and the drive wheel W in the direction of the ground surface G. The drive load $L_2$ can decrease due to the moment $M_2$, so that the frictional engagement between the drive wheel W and the ground surface G decreases, which can increase wheel spin or otherwise impede acceleration.

Figure 1D:
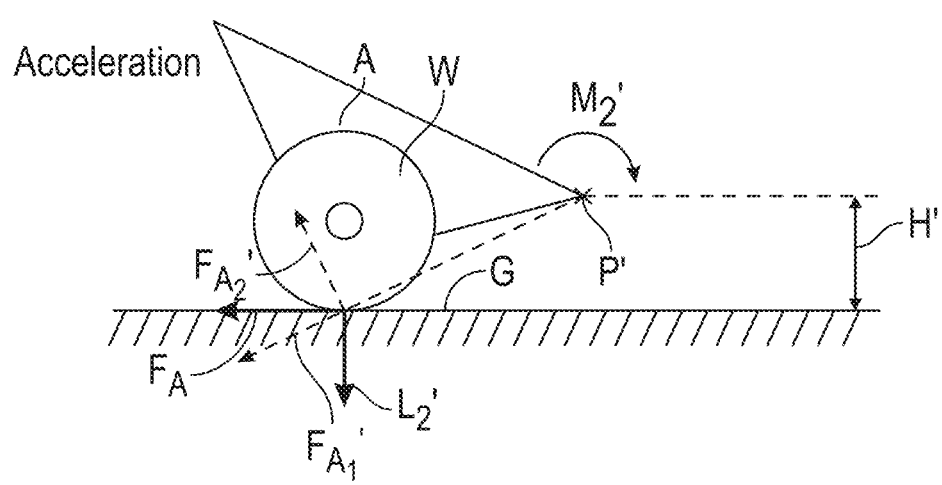
Figure 2:
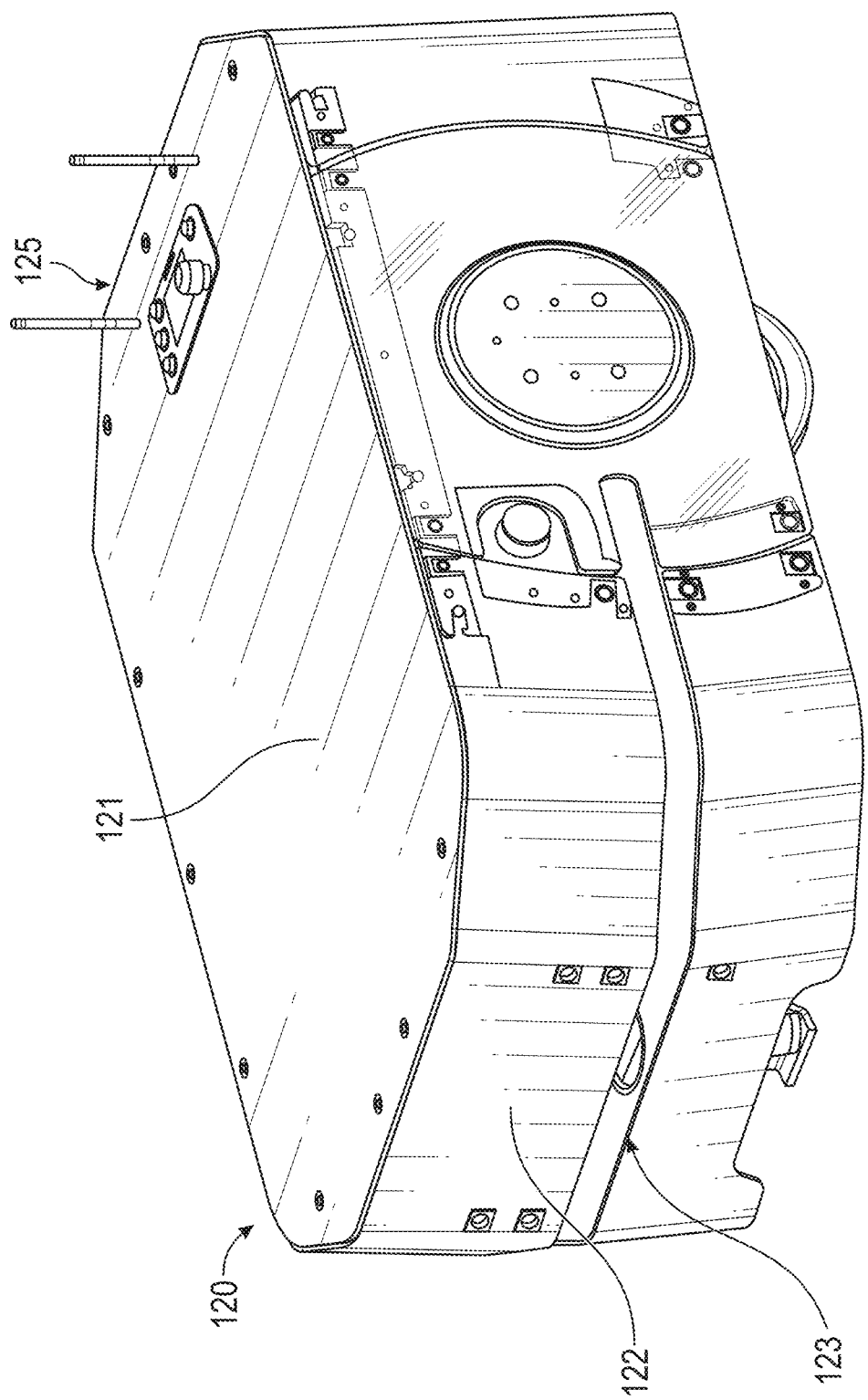
FIG. 2 shows a mobile robot configured as a mobile robotic platform.
Figure 3A:
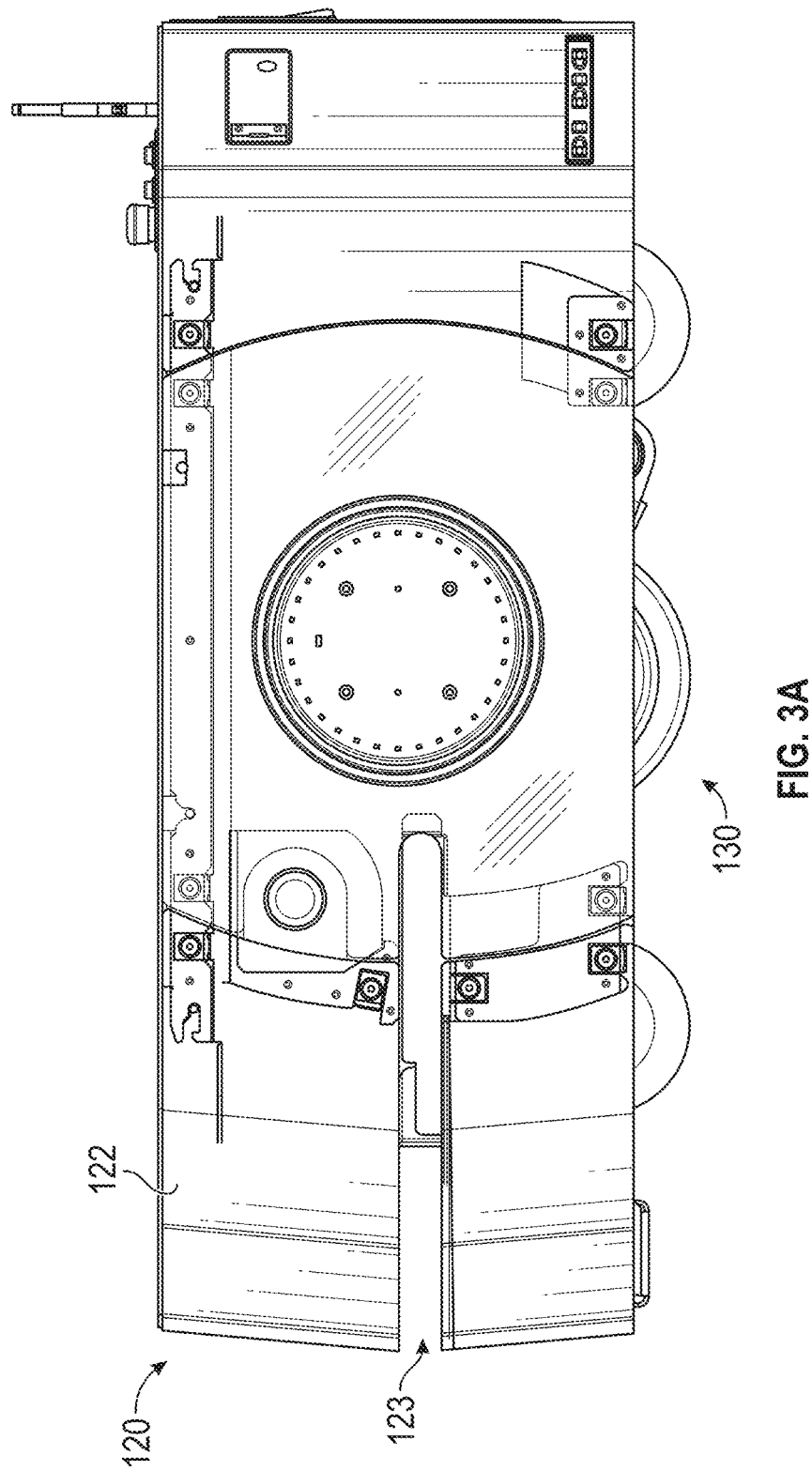
FIG. 3A shows a side view of the mobile robot.
Figure 3B:
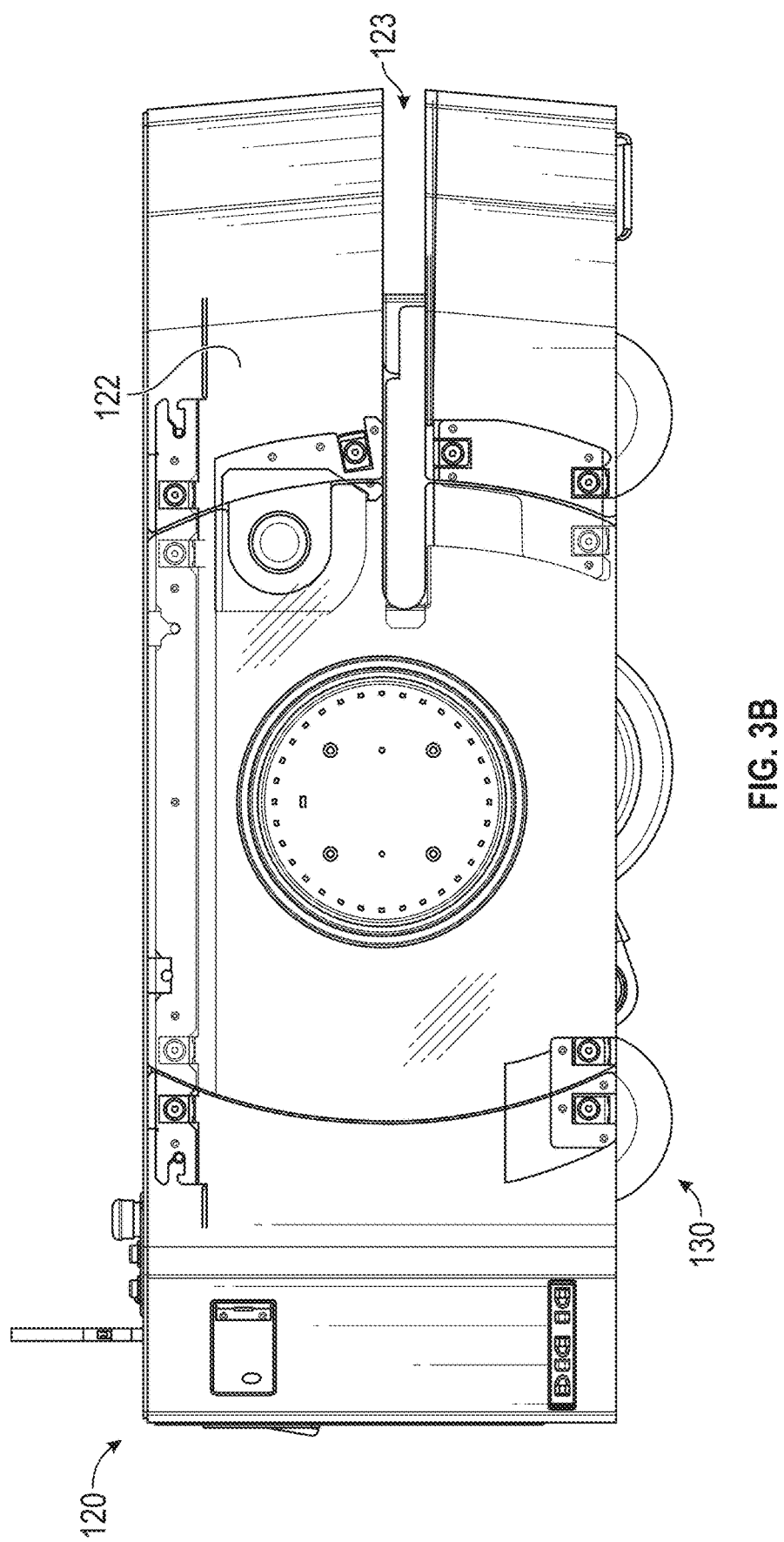
FIG. 3B shows a second side view of a mobile robot.

FIG. 1D shows the drive assembly with an adjusted configuration. The pivot location P' can be at the height H' (e.g., similar to FIG. 1B). The height H' can be lower than the height H in FIG. 1C. During acceleration of the drive wheel W, the ground surface G can exert the acceleration force $F_A$ on the drive wheel W and the control arm A. The acceleration force $F_A$ can create a moment $M_2'$ about the pivot location P'. The acceleration force $F_A$ can include an inline force component $F_{A1}'$ that acts in line with the direction towards the pivot location P' and an orthogonal force component $F_{A2}'$ that is orthogonal to direction towards the pivot location P'.

The orthogonal force component $F_{A2}'$ creates the moment $M_2'$, which can reduce the drive load $L_2'$. Because the height H' of the pivot location P' is lower than the height H on the pivot location P, the force $F_{A2}'$ can be less than the force $F_{A2}$ and the reduction of drive load $L_2'$ in FIG. 1D can be less than the reduction in the drive load $L_2$ of FIG. 1C. Thus, even for the same acceleration force $F_A$ the moment $M_2'$ can be proportionately less than $M_2$ based on the difference between the height H' and the height H. As the height H is decreased towards the ground surface G, accelerating the drive wheel W can be more efficient and/or lead to less wheel spin, for example.

Accordingly, one of the advantages of the mobile robot with the drivetrain and suspension system according to the present disclosure is a configuration that places the pivot location of the control arm A in a position that facilitates braking of the mobile robot while still providing adequate acceleration. Various pivot locations (e.g., rearward of the wheel axis, forward of the wheel axis, above the wheel axis, below the wheel axis, etc.) can be used and can produce different moments for acceleration and deceleration, which can be similar to those discussed in connection with FIGS. 1A-1D, and the pivot location can be positioned to balance the braking and accelerating performance.

FIGS. 2-4B show an example embodiment of a mobile robot 120. The mobile robot 120 can include an upper platform 121. The upper platform 121 can be a planer area, although any other suitable shape or structure can be used. The upper platform 121 can include locations for mounting other robotic implements onto the mobile robot 120. For example, the mobile robot 120 can engage with and movable carts, tables, conveyors, robotic arms, and any other application. The mobile robot 120 can include an outer shielding 122. The outer shielding can include a plurality of sidewalls connected together to enclose or generally enclose navigation systems, communication systems, and power systems and other components used for operating the mobile robot 120.

The mobile robot 120 can be autonomous or semi-autonomous. The mobile robot 120 can comprise a plurality of sensors for sensing the environment. The sensors can include LIDAR and laser-based sensors for mapping the robot's surroundings. The mobile robot 120 can include a laser slit 123 including a range finding or LIDAR-type laser contained therein. The mobile robot 120 can include a user interface 125. In alternative embodiments, the control panel 125 can be located on a side or under a plate or otherwise in an unexposed location on the robot 120.

Figure 4A:
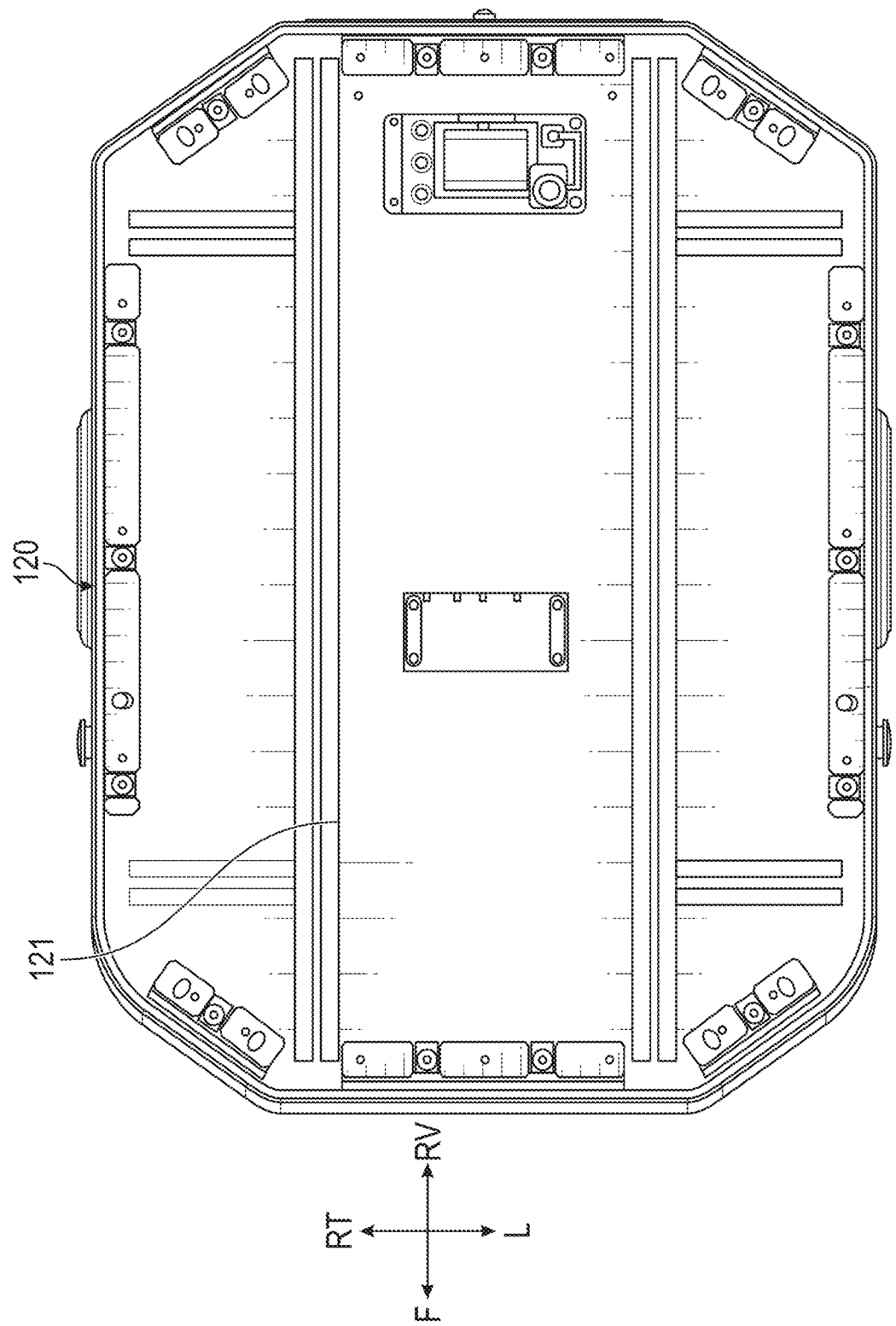
FIG. 4A shows a top view of the mobile robot.

As shown in FIG. 4A, the robot 120 can be generally oriented along a forward-reverse direction F-RV and along a left-right direction L-RT. The forward direction F can be along generally the forward motion of the robot. The reverse direction RV can be opposite the forward direction. The left-right direction L-RT can be orthogonal to the forward-reverse direction F-RV. The left-right direction L-RT and the forward-reverse direction F-RV can be coplanar, for example on a generally horizontal plane.

The robot 120 can include a chassis 140 and a support system 130. The upper platform, the outer shielding and/or any other components of the robot 120 can be mounted on the chassis 140. Various different components and structures can be mounted onto the chassis, depending on the purpose and design of the robot 120. The support system 130 can include a plurality of support wheels 132 (e.g., 2, 3, 4, or more). The support wheels 132 can be coupled with the chassis 140. The support wheels 132 can be caster wheels. The support wheels 132 can support a load on the chassis against a ground surface. In certain embodiments, the support wheels 132 can include individual or combined suspension elements (e.g., springs and/or dampers). Accordingly, in some embodiments, the support wheels 132 can move (e.g., up and down) to accommodate uneven terrain, for shock absorption, and for load distribution. In some embodiments, the support wheels 132 can be fixed so that they do not move up and down, and the ground clearance height of the robot 120 can be constant regardless of the weight or load of the robot 120. The support wheels 132 can be undriven.

The support system can include a first drive assembly 134 and/or a second drive assembly 135. The first and second drive assemblies 134, 135 can provide acceleration, braking, and/or steering of the robot 120. For example, if both drive wheels rotate in a first direction, the robot can move forward; if both drive wheels move in a second direction, the robot can move in reverse; if the drive wheels move in opposite directions, or if only one of drive wheels moves, or if the drive wheels move at different speeds, the robot can turn. Braking can be performed by slowing the rotation of the drive wheels, by stopping rotation of the drive wheels, or by reversing direction of the drive wheels. The first and/or second drive assemblies 134, 135 can be coupled (e.g., pivotably coupled) with the chassis 140. The first and second drive assemblies 134, 135 can be configured to engage with the ground surface through respective suspension systems. The first and second drive assemblies 134, 135 can be located at least partially beneath the outer shielding 122 of the robot 120.

Many variations are possible. For example, a single drive assembly can be used, in some cases, which can move the robot forward and/or backward, and steering can be implemented using a separate steering system, such as one or more steering wheels that can turn left or right. In some embodiments, the robot 120 can include 3 or 4 drive assemblies. In certain alternative embodiments, the mobile robot 120 includes only driven wheels and no undriven support wheels. In some cases, the one or more drive assemblies can support at least some weight of the robot and/or payload. For example, a robot can include two drive wheels and two non-driven support wheels.

Figure 5:
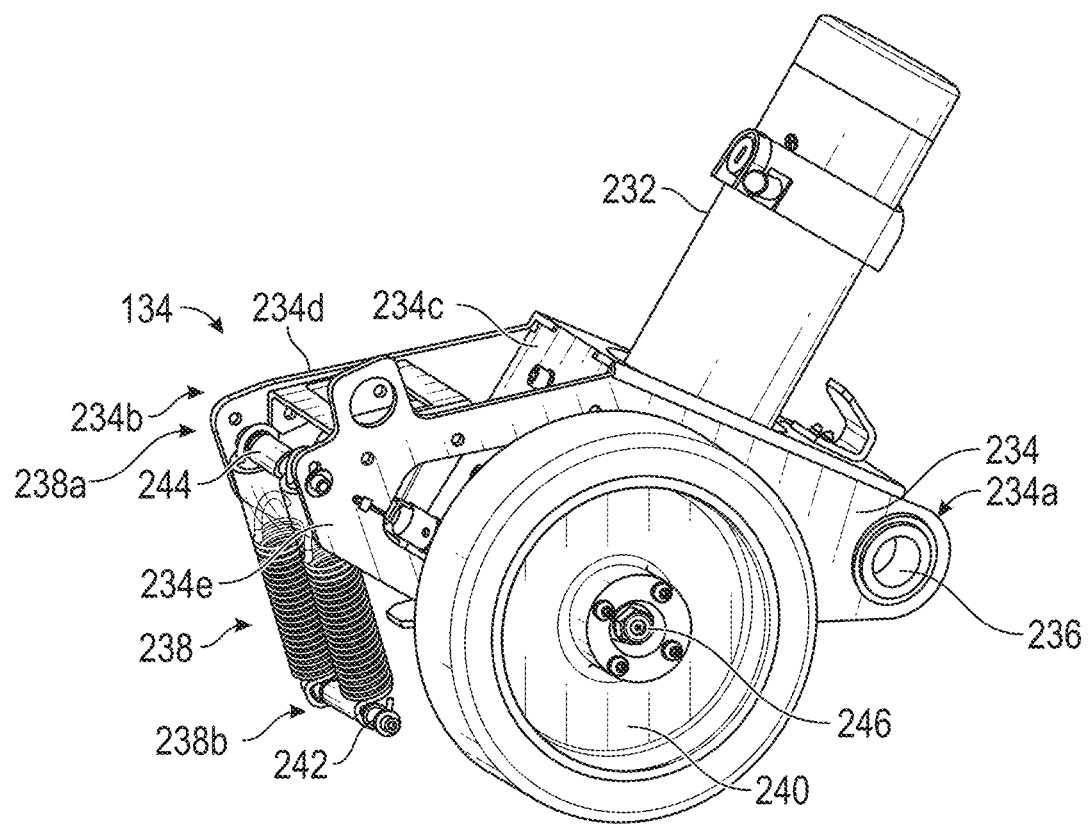
FIG. 5 shows a perspective view of a drive assembly.
Figure 6:
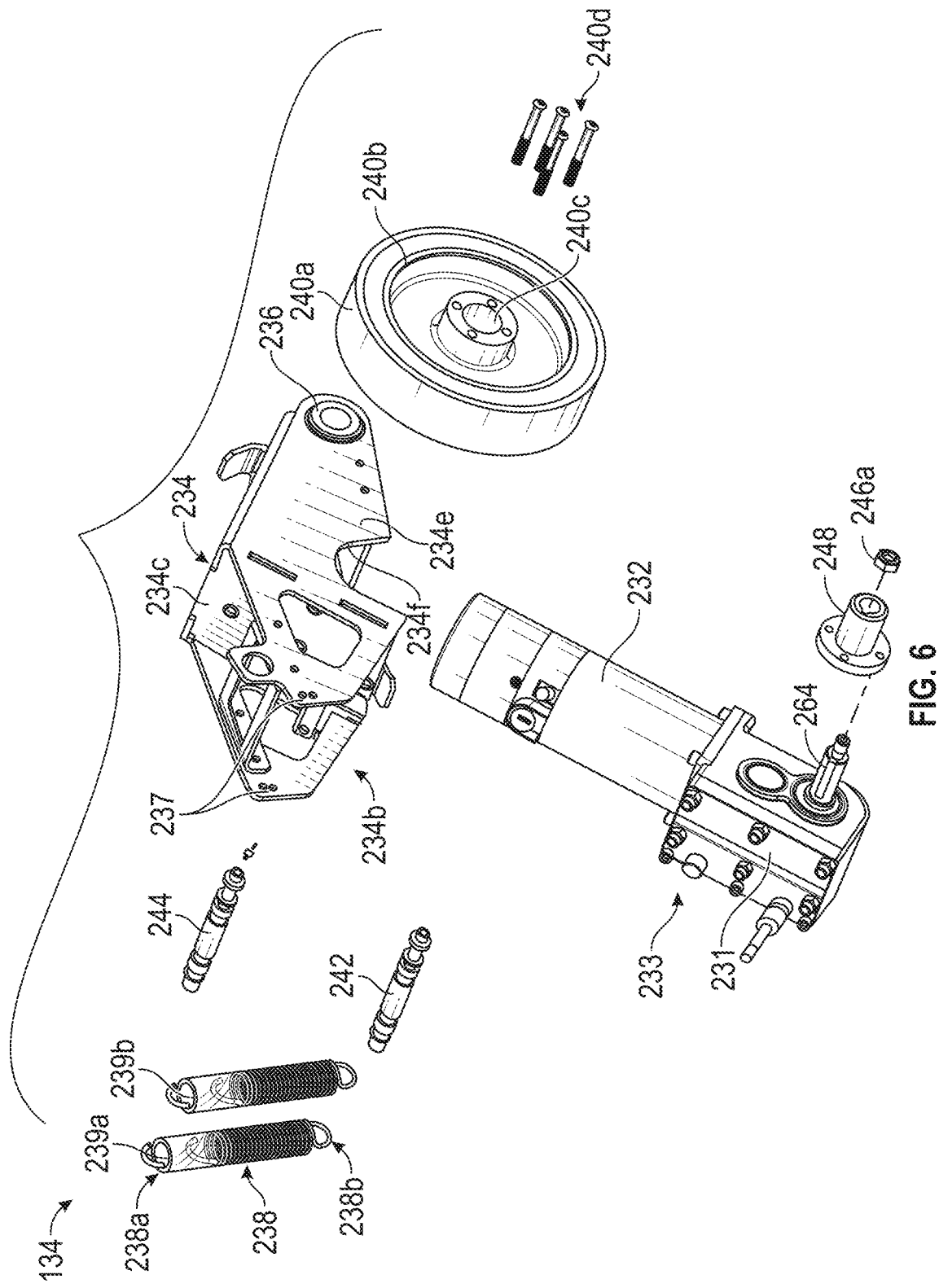
FIG. 6 shows an exploded view of the drive assembly.

FIGS. 5-6 show the first drive assembly 134. The drive assembly 134 can include a control arm 234. The control arm 234 can include a first end 234a and a second end 234b. The first end 234a of the control arm 234 can include a pivot aperture 236. The pivot aperture 236 can be a pivot location for the control arm 234. The pivot aperture 236 can be located on the first end 234a. The control arm 234 can include a connection location 237. The connection location 237 can be located on the second end 234b of the control arm 234. The connection location 237 can include one or more apertures or other mounting hardware features.

The control arm 234 can include a plurality of plates assembled together. The control arm 234 can include a mounting plate 234c. The control arm 234 can include a first side plate 234d and a second side plate 234e. The first and second side plates 234d, 234e can extend from the first end 234a to the second end 234b of the control arm 234. The first and second side plates 234d, 234e can be generally parallel with each other. The mounting plate 234c can couple together the first and second side plates 234d, 234e. In certain implementations, the control arm 234 can include multiple plates coupling together the first and second side plates 234d, 234e. The mounting plate 234c can include one or more mounting apertures or mounting hardware. The control arm 234 can include a cutout 234f on one or both of the side plates 234d, 234e. The cutout 234f can be at least partially aligned with the mounting plate 234c. The cutout 234f can be located between the first end 234a and the second end 234b.

The drive assembly 134 can include an upper pin 244. The upper pin 244 can be a generally cylindrical member. The upper pin 244 can include can include one or more circumferential segments or axial segments that are sized to engage within one or more apertures within the control arm 234. The upper pin 244 can be coupled with the second end 234b of the control arm 234. The upper pin 244 can be mounted within the one or more apertures of the connection location 237.

The drive assembly 134 can include a biasing member 238. The biasing member 238 can comprise one or more springs, such as wire springs, elastic materials, torsional spring or other biasing component. The biasing member 238 can include a pair of springs 239a, 239b. The springs 239a, 239b can be wire coil springs. The springs 239a, 239b can be equal in length. The springs 239a, 239b are shown in the Figures in a relaxed position, with a stretched position sometimes shown transparently. In other implementations, the springs 239a, 239b can be different lengths and/or mounted along different locations of the control arm 234. In some cases, a single spring 239 or other biasing member 238 can be used for the drive assembly.

A first end 238a of the biasing member 238 can be coupled with the second end 234b of the control arm 234. The first end 238a of the biasing member 238 can include a mount. The mount can be a hook or other coupler. The coupling can take place through one or more mechanical engagements such as engagement of the mount with the upper pin 244. The upper pin 244 can include one or more contours for maintaining a spacing of the springs 239a, 239b.

A second end 238b of the biasing member 238 can include a mount for coupling with the chassis 140. A second pin 242 can connect with the mount (e.g., hook) at the second end 238b of the biasing member 238. The lower pin 242 can include one or more contours for maintaining a spacing of the springs 239a, 239b.

The drive assembly 134 can include a drivetrain 233. The drivetrain 233 can include a motor 232. The motor 232 can be any type of motor such as a brushed or brushless electric motor. The motor 232 can include a generally cylindrical casing. The drivetrain 233 can include a gearbox 231. The gearbox 231 can include an outer housing. The gearbox 231 can include an input and an output into a transmission. An output shaft of the motor 232 can be mounted on the gearbox 231 at the input. The output of the gearbox 231 can include an output shaft 246. The output shaft can extend orthogonally with respect to the assembled motor 232 and gearbox 233. The gearbox 231 can be a worm gear/worm wheel, a planetary gearbox, or any suitable type of transmission.

The drivetrain 233 can be mounted on the mounting plate 234c of the control arm 234 by one or more mechanical fasteners. The drivetrain 233 can be mounted between the first end 234a and the second end 234b of the control arm 234. The drivetrain 233 can be mounted between the first and second side panels 234d, 234e of the control arm 234. The output shaft 246 can be generally aligned with the cutout 234f. The motor 232 and/or the gearbox 231 can extend in a generally orthogonal orientation with the control arm 234, as illustrated. In another implementation, the motor 232 can be axially aligned with the output shaft 246. In some cases, the gearbox 233 can be omitted.

The drive assembly 134 can include a drive wheel 240. The drive wheel 240 can include a tire 240a. The tire 240a can be made out of a durable and/or grip enhancing material such as an elastomer, rubber or the like. The tire can be a solid material, or can be pneumatic, or any other suitable type of tire. The drive wheel 240 can include an outer rim 240b. The tire 240a can be mounted on the outer rim 240b. A web can attach the outer rim 240b with an inner hub 240c. The inner hub 240c can be centered on the drive wheel 240. Any suitable wheel can be used.

The inner hub 240c can include a central aperture. A bushing 248 can be mountable within the central aperture. The bushing 248 can include a flange and a cylindrical portion. The cylindrical portion can include an inner aperture including a slot. The inner aperture and slot can be keyed for engaging with a key on the output shaft 246 for transferring torque from the output shaft 246 to the drive wheel 240. The bushing 248 can be mounted on the inner hub 240c by one or more mechanical fasteners 240d. A nut 246a can be threadingly engaged with a tip of the output shaft 246 to assemble the wheel 240 with the drivetrain 233. Many variations are possible, and the drive wheel 240 can be coupled to the motor 232 by any suitable mechanism that enables the motor 232 to rotate the drive wheel 240.

Figure 7:
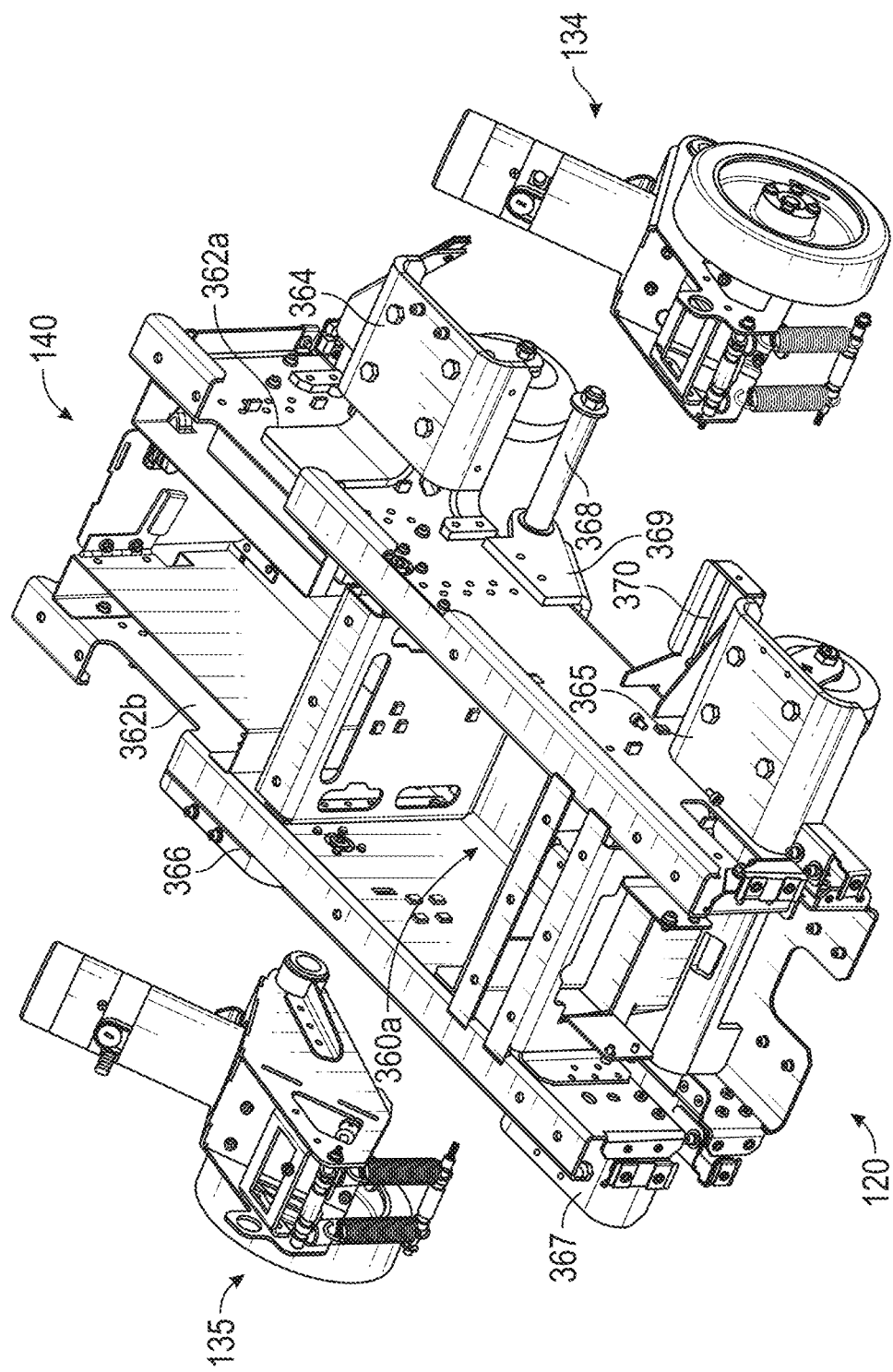
FIG. 7 shows an exploded view of a chassis of the mobile robot.
Figure 8:
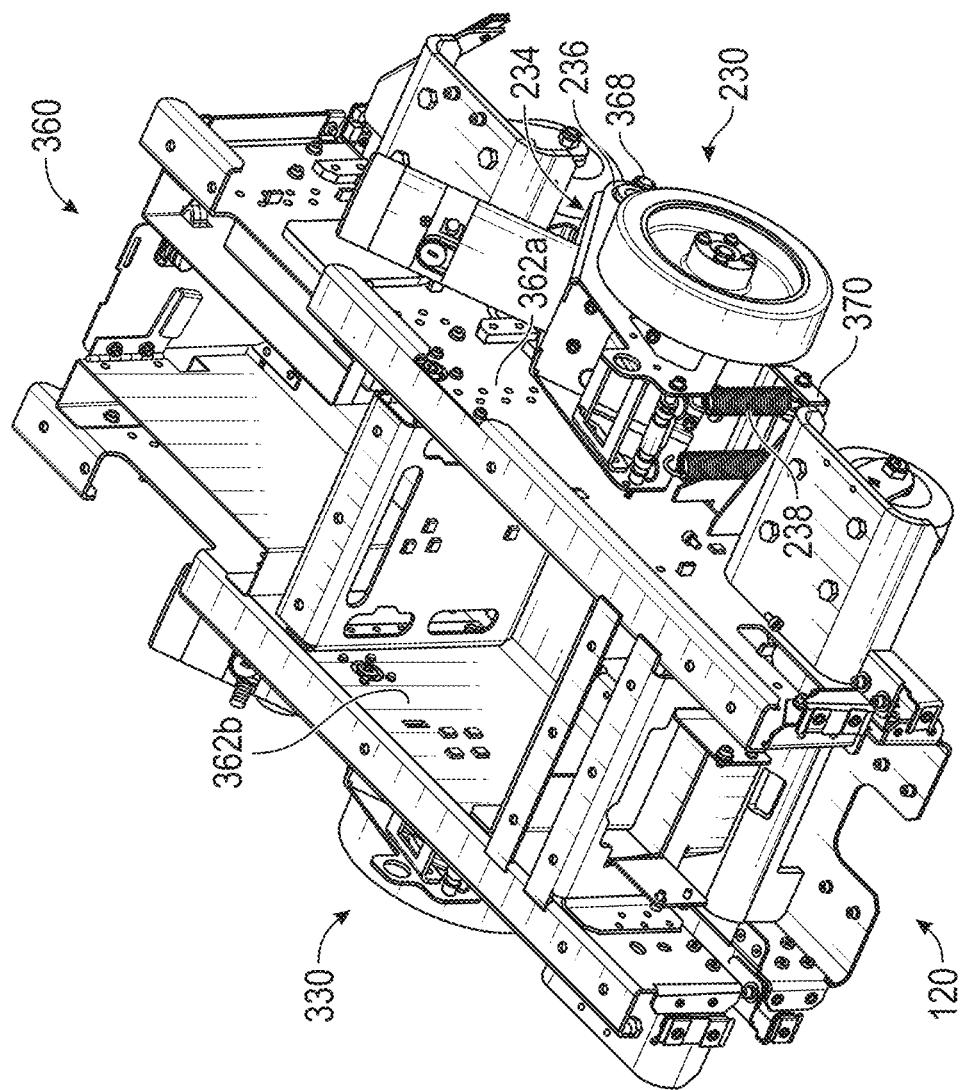
FIG. 8 shows an assembled view of the chassis.
Figure 9:
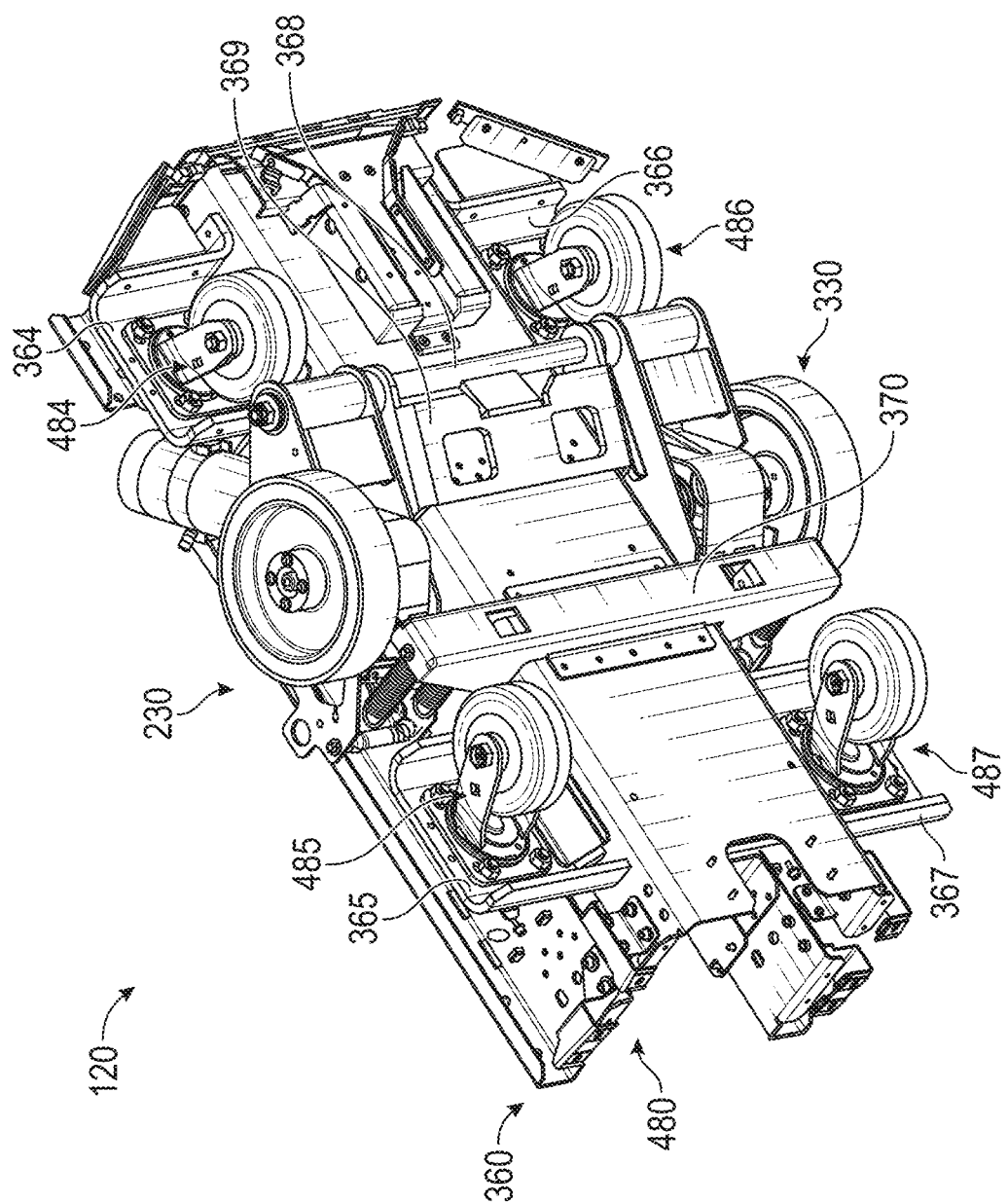
FIG. 9 shows a bottom perspective view of the chassis.

FIGS. 7-9 show the chassis 140 and drive assemblies 134, 135 of the mobile robot 120. The chassis 140 can generally provide structural support to the support system 130 and the upper platform 121 of the mobile robot 120. The chassis 140 can comprise a unitary structure or multiple different structural elements that are mechanically connected together such as by a plurality of mechanical fasteners.

The chassis 140 can include an interior portion 360a. The interior portion 360a can be located between one or more panels 362a, 362b. The interior portion 360a can be sized to receive one or more electrical components or payload for the mobile robot 120.

The chassis 140 can include a plurality of wheel mounts 364-367. The wheel mounts 364-367 can include a first, second, third, and/or fourth wheel mounts 364-367. Each of the wheel mounts 364-367 can comprise a generally U-shaped member. Each of the wheel mounts 364-367 can include a planer portion that is generally parallel with the ground surface.

The first and second wheel mounts 364, 365 can be located on a first side of the chassis 140. The first and second wheel mounts 364, 365 can extend outwardly from the panel 362a. The third and fourth wheel mounts 366, 367 can be mounted on a second side of the chassis 140, opposite the first side. The third and fourth wheel mounts 366, 367 can extend outwardly from the panel 362b. Each of the wheel mounts 364-367 can comprise one or more flanges for attachment with the respective side panels. In other implementations, the wheel mounts 364-367 can be formed integrally with the chassis 140.

The support wheels 132 can comprise first, second, third, and fourth caster wheels 484-487. Each caster wheel 484-487 can include a wheel, a bracket and a mount flange. The bracket can be generally U-shaped and attach with an axle on which the wheel is rotated. The bracket can be rotatably coupled with the mount flange. Each caster wheel 484-487 can be mounted on a respective wheel mount 364-367. The mount flange can be attached with the planar portion of each of the respective wheel mounts 364-367. In alternative embodiments, more or fewer wheels and wheel mounts can be included in the support wheels 132. Alternatively, the wheels 484-487 can be omni-wheels or other suitable wheel types can be used.

The chassis 140 can include an axle 368. The axle 368 can be mounted with the side panels 362a, 362b by a mounting bracket 369. The mounting bracket 369 can include a pair of spaced flanges. A transverse member can connect the spaced flanges. The spaced flanges can be mechanically coupled with the chassis 140. The spaced flanges can each include an aperture for receiving the axle 368. The axle 368 can extend laterally in the left-right direction. The axle 368 can extend laterally outward past the respective panel 362a, 362b on either side of the chassis 140. Alternatively, each side of the chassis 140 can include a separate axle.

The drive assemblies 134, 135 can be assembled with the chassis 140. The control arm 234 of the drive assembly 134 can be pivotally mounted on the axle 368. The pivot aperture 236 can be mounted on the axle 368. Alternatively, the control arm 234 can include the axle and the chassis 140 can include the aperture for receiving the axle. The control arm 234 can be pivotable about the axle 368 with respect to the chassis 140. The drive assembly can have a single degree of freedom (e.g., rotation of the control arm 234 about the axle 368). The pivot axis of the drive assembly (e.g., of the control arm 234) can be generally parallel to the rotation axis of the drive wheel 240. For example, an angle between the directions of the pivot axis and the rotation axis can be less than about 20 degrees, less than about 15 degrees, less than about 10 degrees, less than about 5 degrees, or about 0 degrees, or any values or ranges therebetween. Other alternatives are possible, for example, where the control arm 234 could move with at least some range in two or more degrees of freedom.

The biasing member 238 can be coupled with the chassis 140 at a connecting member 370. The connecting member 370 can be an elongate member that couples with the chassis 140. Alternatively, the connecting member 370 can be an integral portion of the chassis 140. The connecting member can extend laterally outwardly on one or both sides of the chassis 140. The connecting member 370 can extend in a generally orthogonal direction from the side panels 362a, 362b. The connecting member 370 can comprise a planer portion as a part of a U-shaped flange. The connecting member 370 can comprise one or more apertures for receiving the mount of the second end 238b of the biasing member 238. The biasing member 238 can be coupled at the connecting member 370 with the lower pin 242 or in any other suitable manner.

Figure 10:
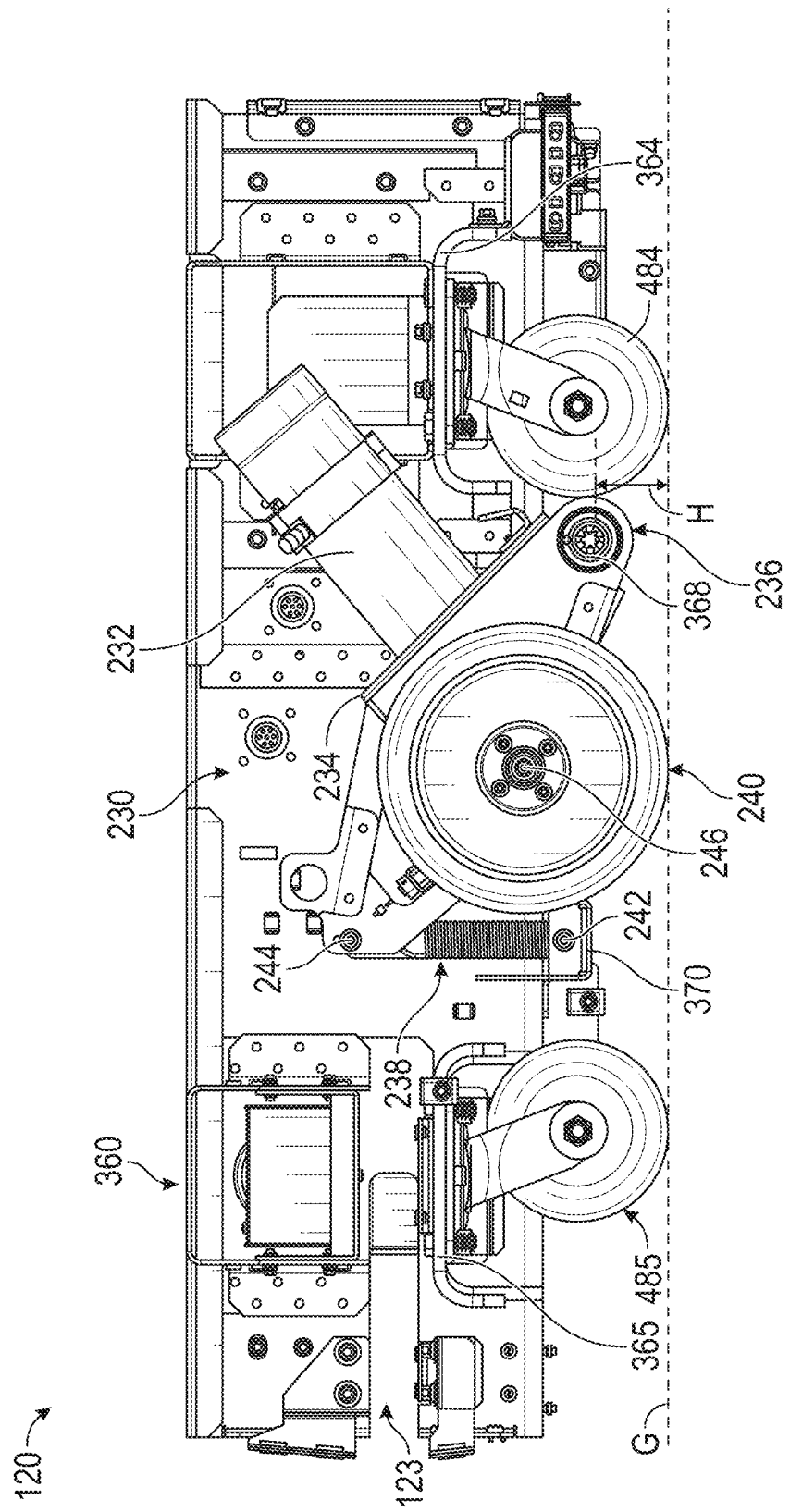
FIG. 10 shows a suspension system of the mobile robot in an engaged configuration.
Figure 11:
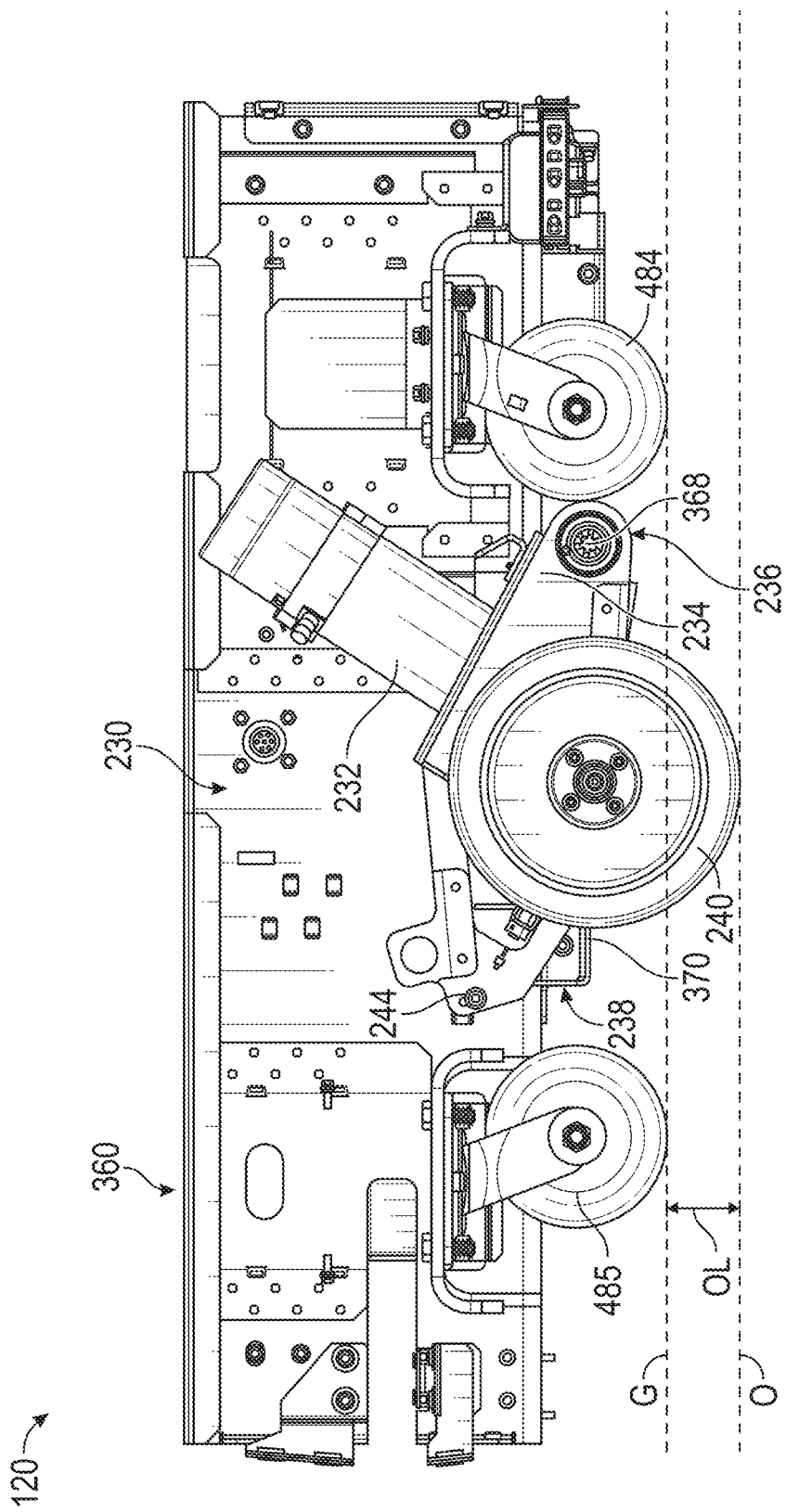
FIG. 11 shows the suspension system in a disengaged configuration.

With reference to FIGS. 10-11, the drive assembly 234 can be in an engaged configuration (FIG. 10) and a disengaged configuration (FIG. 11). In the disengaged configuration, the biasing member 238 can bias the control arm 234 and the drive wheel 240 into a lowered position in which the drive wheel 240 aligns at an offset plane O that is an offset length OL below the ground plane G on which the support wheels 484-487 are designed to rest. Accordingly, when the mobile robot 120 is placed on the ground surface G, the support wheels 484-487 can support the chassis 140 on the ground surface G. The weight of the robot 120 can overcome the bias of the biasing member 238 and allow the control arm 234 to be rotated upward such that the bottom of the drive wheel 240 can align generally with the bottom of the support wheels 484-487 and the ground surface G. Although shown as a flat plane, the ground surface G can include contours and the drive wheel 240 can move to accommodate variations in elevation and still engage with the ground surface G.

The weight of the mobile robot 120 and any payload can be distributed through the support wheels 484-487. Engagement of the drive wheel 240 with the ground surface G can be independent of the weight of, or load on, the mobile robot 120. Engagement of the drive wheel 240 with the ground surface G can be based on the spring value (i.e., position) of the biasing member 238 and control arm 234. The biasing member 238 can change length between the engaged and disengaged configuration. The engagement force of the drive wheel on the ground surface can be at least partially based on the offset length OL. Alternatively, the drive assembly 234 can include a torsional spring, an internal weight, or another mechanism for biasing the drive wheel 240 into the ground surface G. In some implementations, the weight of the drive assembly itself can be sufficient to bias the drive assembly downward to sufficiently engage the ground surface G. In some cases, additional weight can be added to increase the biasing of the drive assembly downward.

In some embodiments, one or more dampers can be used with the springs 239a, 239b or other biasing member 238. In some embodiments, the springs 239a, 239b, or other biasing member 238 can connect to the chassis 140 at a location higher than the connection location 237 on the control arm 234. For example, the one or more springs can be compressed when the drive wheel 240 is pressed upward by the ground surface, rather than being stretched as illustrated.

As discussed above in relation to FIGS. 1A-D, the configuration of the drive assembly 234 can influence the amount of traction during braking and acceleration provided by the drive wheel 240. The pivot location (e.g., the pivot aperture 236 and the axle 368) can be a height H above the ground surface G and/or above the bottom of the support wheel(s) 132. The height H can control the engagement of the drive wheel 240 with the ground surface during acceleration and deceleration. By adjusting the height H, the drive assembly 234 can provide a desirable balance between acceleration and deceleration performance.

When the robot 120 decelerates, a braking force is applied to the bottom of the drive wheel in the reverse direction (to the right in FIG. 10). Because the pivot location (e.g., the pivot aperture 236 and the axle 368) is a height H above the ground and/or above the bottom of the drive wheel 240, the braking force produces a moment or torque to the drive assembly (e.g., counter-clockwise in FIG. 10) that increases the force pressing the drive wheel 240 onto the ground surface G, which can improve traction during braking.

When the robot 120 accelerates in the forward direction, an acceleration force is applied to the bottom of the drive wheel 240 in the forward direction (e.g., to the left in FIG. 10). Because the pivot location (e.g., the pivot aperture 236 and the axle 368) is a height H above the ground and/or above the bottom of the drive wheel 240, the acceleration force produces a moment or torque to the drive assembly (e.g., clockwise in FIG. 10) that decreases the force pressing the drive wheel 240 onto the ground surface G. This can produce wheel spin and impede reliable and efficient acceleration. By placing the pivot location at a low position, the height H can be made sufficiently small that acceleration is not compromised, while still providing the benefit of improved traction during braking.

When accelerating in the reverse direction (e.g., during braking while moving forward), the resulting moment or torque on the drive assembly can increase the force pressing the drive wheel 240 onto the ground surface, which can result in improved traction when accelerating in the reverse direction (e.g., when braking while moving forward), When braking while moving in the reverse direction, the resulting moment or torque on the drive assembly can decrease the force pressing the drive wheel 240 onto the ground surface G. In some cases, the robot 120 can be configured to not move in the reverse direction (e.g., instead turning 180 degrees and moving in the new forward direction). In some cases, the direction of movement for the robot 120 could be chosen depending on whether the particular movement would prefer improved traction for braking or accelerating.

The control arm 234 can be generally aligned along a forward-rearward direction F-RV for the mobile robot. The drive wheel 240 can be coupled with the control arm 234 at a location forward of the pivot location of the control arm 234. As the drive wheel 240 accelerates or decelerates, the drive wheel 240 exerts a drive force on the ground surface that creates a moment on the control arm about the pivot location. The moment can decrease or increase frictional engagement between the drive wheel 240 and the ground surface G, depending on the direction of force on the drive wheel 240. By adjusting the height H of the pivot location above the ground surface G to a low position on the chassis, a balance between the braking power and the acceleration power through the engagement of a drive wheel with the ground surface can be achieved.

Accordingly, in certain implementations, the position of the pivot location can be below an axis of the drive shaft 246 or below one or more of the axles of the support wheels 484-487. The pivot axis for the control arm can be lower than the axis of rotation of the drive wheel 240 and/or can be lower than the axis of rotation of one or more of the support wheels 484-487. The pivot location can be at a lowermost point on the chassis 140. The structure providing the pivot location can be the lowest structure of the chassis 140. The pivot location can be rearward of and/or lower than the axis of rotation of the drive wheel 240, A ratio between a) the distance between the pivot location and the axis of rotation of the drive wheel 240; and b) the height H of the pivot location above the ground surface G, can be about 2 to 1, about 2.5 to 1, about 3 to 1, about 3.5 to 1, about 4 to 1, about 4.5 to 1, about 5 to 1, about 6 to 1, about 7 to 1, about 8 to 1, about 9 to 1, about 10 to 1, or any values or ranges therebetween. With reference to at least FIG. 1B, an angle "D" between the bottom of the drive wheel 240 (e.g., when on the ground surface G and/or when positioned to align with the bottoms of the support wheels 132) and the pivot location can be about 45 degrees, about 40 degrees, about 35 degrees, about 30 degrees, about 25 degrees, about 20 degrees, about 15 degrees, about 10 degrees, about 7 degrees, about 5 degrees, about 3 degrees, about 2 degrees, about 1 degree, or any values or ranges therebetween. The height H of the pivot location above the ground surface G or the bottoms of the drive wheels 132 can be about 6 inches, about 5 inches, about 4 inches, about 3 inches, about 2 inches, about 1 inch, about 0.5 inches, or any values or ranges therebetween.

With reference to FIGS. 10 and 11, when the drive wheel 240 moves up and down, the drive wheel 240 can move forward or rearward (e.g., to a lesser degree) due to the rotation of the drive assembly. The motor 232 (e.g., the entire drivetrain 233) can pivot with the control arm 234. When the drive wheel 240 moves mostly up and down (e.g., with a lesser degree of movement rearward and forward), the motor 232 can move mostly rearward and forward (e.g., with a lesser degree of movement up and down). Thus, the robot 120 can accommodate the movement of the motor 232 without significantly increasing the height of the robot 120. In some embodiments, at least a portion of the motor 232 can be disposed directly above and/or rearward of the pivot axis of the drive assembly. In some implementations, a portion of the motor 232 can move downward as the drive wheel 240 moves upward. The motor 232 or drivetrain 233 can extend away from the drive wheel 240 (or the output shaft 246) in an upward direction that is angled towards the pivot location. A portion of the motor 232 or drivetrain 233 can be disposed directly above the pivot location or pivot axis for the control arm 235.

Figure 12A:
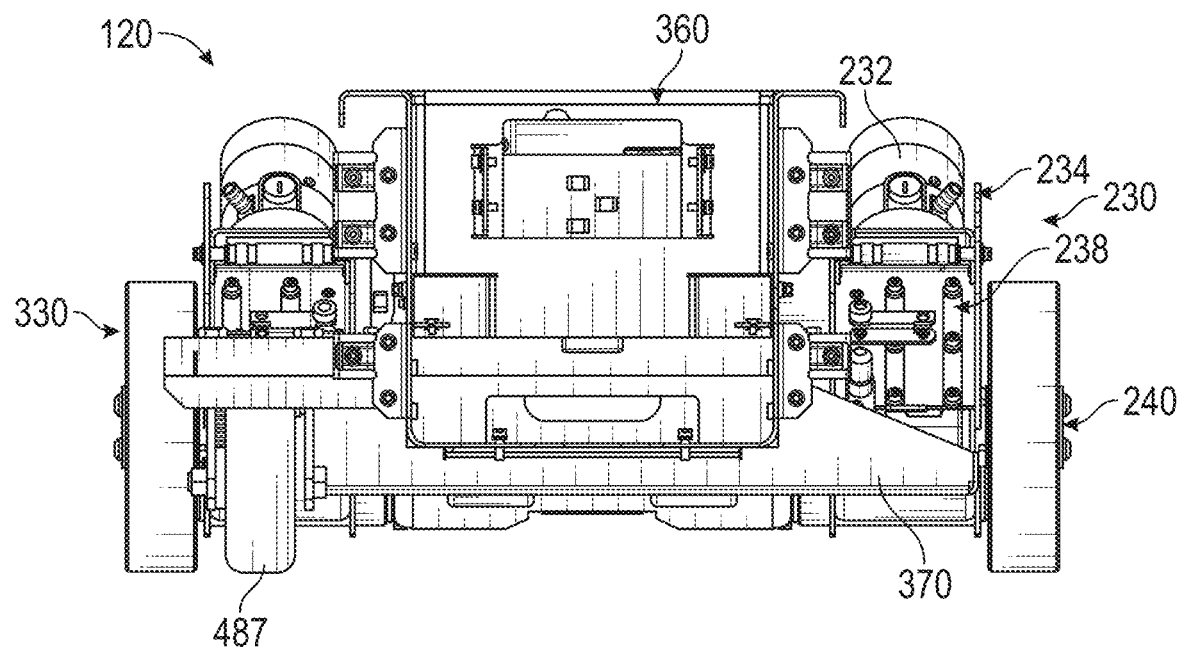
FIG. 12A shows a front view of an example embodiment of a support system.
Figure 12B:
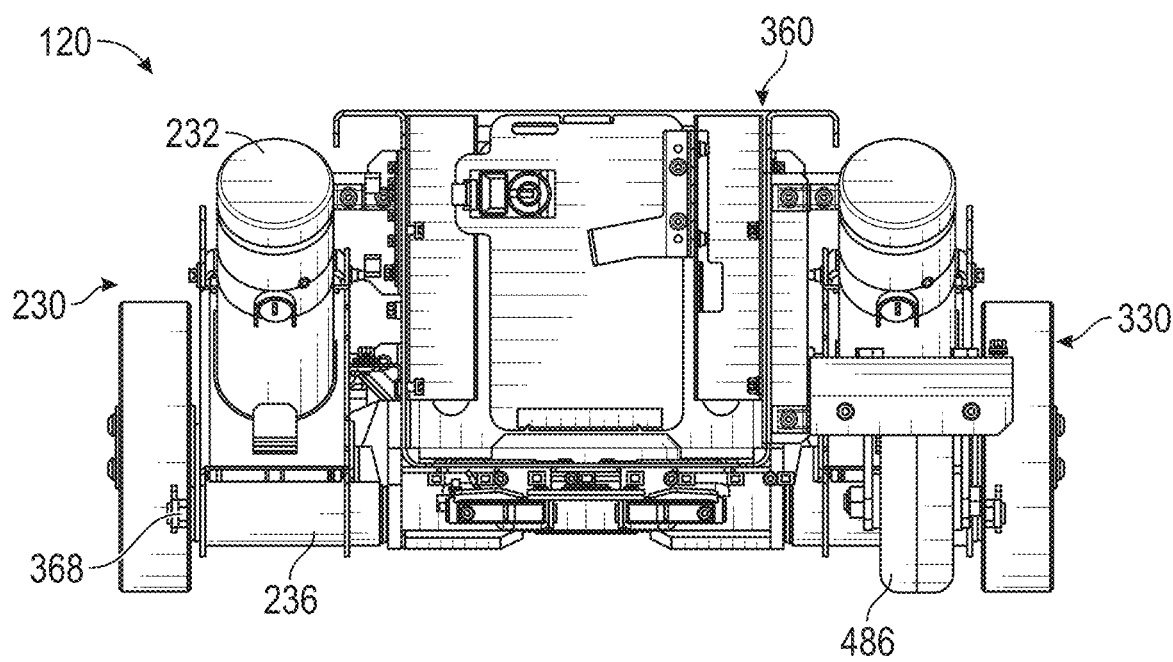
FIG. 12B shows a rear view of the support system.

FIGS. 12A-B show the mobile robot 120 with certain features of the chassis 140 and the support system 132 omitted to better view the drive assembly 134.

The pivotable drive assembly can have a more simple construction (e.g., fewer components and/or fewer moving parts) as compared to a suspension system that causes the drive assembly to move linearly (e.g., up and down), which can reduce cost, increase longevity, reduce repairs, reduce assembly time, and reduced size.

Certain Terminology

Terms of orientation used herein, such as "top," "bottom," "proximal," "distal," "longitudinal," "lateral," and "end," are used in the context of the illustrated example. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular," "cylindrical," "semi-circular," or "semi-cylindrical" or any related or similar terms, are not required to conform strictly to the mathematical definitions of circles or cylinders or other structures, but can encompass structures that are reasonably close approximations.

Conditional language, such as "can," "could," "might," or "may," unless specifically stated otherwise, or otherwise understood within the context as used, is generally intended to convey that certain examples include or do not include, certain features, elements, and/or steps. Thus, such conditional language is not generally intended to imply that features, elements, and/or steps are in any way required for one or more examples.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain examples require the presence of at least one of X, at least one of Y, and at least one of Z.

The terms "approximately," "about," and "substantially" as used herein represent an amount close to the stated amount that still performs a desired function or achieves a desired result. For example, in some examples, as the context may dictate, the terms "approximately," "about," and "substantially," may refer to an amount that is within less than or equal to 10% of the stated amount. The term "generally" as used herein represents a value, amount, or characteristic that predominantly includes or tends toward a particular value, amount, or characteristic. As an example, in certain examples, as the context may dictate, the term "generally parallel" can refer to something that departs from exactly parallel by less than or equal to 20 degrees. All ranges are inclusive of endpoints.

SUMMARY

Several illustrative examples of mobile robots have been disclosed. Although this disclosure has been described in terms of certain illustrative examples and uses, other examples and other uses, including examples and uses which do not provide all of the features and advantages set forth herein, are also within the scope of this disclosure. Components, elements, features, acts, or steps can be arranged or performed differently than described and components, elements, features, acts, or steps can be combined, merged, added, or left out in various examples. All possible combinations and subcombinations of elements and components described herein are intended to be included in this disclosure. No single feature or group of features is necessary or indispensable.

Certain features that are described in this disclosure in the context of separate implementations can also be implemented in combination in a single implementation. Conversely, various features that are described in the context of a single implementation also can be implemented in multiple implementations separately or in any suitable subcombination. Moreover, although features may be described above as acting in certain combinations, one or more features from a claimed combination can in some cases be excised from the combination, and the combination may be claimed as a subcombination or variation of a subcombination.

Any portion of any of the steps, processes, structures, and/or devices disclosed or illustrated in one example in this disclosure can be combined or used with (or instead of) any other portion of any of the steps, processes, structures, and/or devices disclosed or illustrated in a different example or flowchart. The examples described herein are not intended to be discrete and separate from each other. Combinations, variations, and some implementations of the disclosed features are within the scope of this disclosure.

While operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Additionally, the operations may be rearranged or reordered in some implementations. Also, the separation of various components in the implementations described above should not be understood as requiring such separation in all implementations, and it should be understood that the described components and systems can generally be integrated together in a single product or packaged into multiple products. Additionally, some implementations are within the scope of this disclosure.

Further, while illustrative examples have been described, any examples having equivalent elements, modifications, omissions, and/or combinations are also within the scope of this disclosure. Moreover, although certain aspects, advantages, and novel features are described herein, not necessarily all such advantages may be achieved in accordance with any particular example. For example, some examples within the scope of this disclosure achieve one advantage, or a group of advantages, as taught herein without necessarily achieving other advantages taught or suggested herein. Further, some examples may achieve different advantages than those taught or suggested herein.

Some examples have been described in connection with the accompanying drawings. The figures are drawn and/or shown to scale, but such scale should not be limiting, since dimensions and proportions other than what are shown are contemplated and are within the scope of the disclosed invention. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various examples can be used in all other examples set forth herein. Additionally, any methods described herein may be practiced using any device suitable for performing the recited steps.

For purposes of summarizing the disclosure, certain aspects, advantages and features of the inventions have been described herein. Not all, or any such advantages are necessarily achieved in accordance with any particular example of the inventions disclosed herein. No aspects of this disclosure are essential or indispensable. In many examples, the devices, systems, and methods may be configured differently than illustrated in the figures or description herein. For example, various functionalities provided by the illustrated modules can be combined, rearranged, added, or deleted. In some implementations, additional or different processors or modules may perform some or all of the functionalities described with reference to the examples described and illustrated in the figures. Many implementation variations are possible. Any of the features, structures, steps, or processes disclosed in this specification can be included in any example.

In summary, various examples of mobile robots and related methods have been disclosed. This disclosure extends beyond the specifically disclosed examples to other alternative examples and/or other uses of the examples, as well as to certain modifications and equivalents thereof. Moreover, this disclosure expressly contemplates that various features and aspects of the disclosed examples can be combined with, or substituted for, one another. Accordingly, the scope of this disclosure should not be limited by the particular disclosed examples described above, but should be determined only by a fair reading of the claims. In some embodiments, the drive systems and/or support systems disclosed herein can be used to move other devices or systems different than a mobile robot.

What is claimed is:

1. A mobile robot comprising:
   a chassis;
   a support system including at least three support wheels configured to support the chassis on a ground surface;
   a drive system including a first drive assembly coupled with the chassis and configured to accelerate the mobile robot across the ground surface, the first drive assembly comprising:
   a control arm having a first end, the first end pivotally coupled with the chassis at a pivot location, wherein the pivot location is a lowest elevation point on the chassis;
   a biasing member having an upper end and a lower end, the lower end coupled with the chassis at a connection location and the upper end coupled with the control arm at a distance spaced from the first end;
   a drivetrain including a drive shaft and a motor mounted on the control arm; and a drive wheel mounted on the drive shaft, the drive wheel aligned along a forward-reverse direction of the mobile robot and rotatable about an axis aligned along a lateral direction that is generally orthogonal to the forward-reverse direction;

wherein the control arm is generally aligned along the forward-reverse direction and the connection location is located forward of the pivot location.

2. The robot of claim 1, wherein the biasing member is configured to bias the drive wheel to a disengaged configuration such that when the mobile robot is placed on the ground surface, the drive wheels exerts an engagement force on the ground surface based on a position of the biasing member.

3. The robot of claim 1, wherein a load on the mobile robot is supported by the chassis through the support system and an engagement force exerted by the first drive assembly against the ground surface is independent of the load.

4. The robot of claim 1, wherein braking using the drive wheel increases an engagement force between the drive wheel and the ground surface.

5. The robot of claim 1, wherein accelerating forward using the drive wheel decreases an engagement force between the drive wheel and the ground surface.

6. The robot of claim 1, wherein an axis of the pivot location is located below the connection location.

7. The robot of claim 1, wherein an axis of the pivot location is located below an axis of the drive shaft.

8. The robot of claim 1, wherein the at least three support wheels each include respective axles and an axis of the pivot location is located below each of the axles of the support wheels.

9. The robot of claim 1, wherein the pivot location is aligned with the control arm and the connection location in the forward-reverse direction.

10. The robot of claim 1, wherein the drive wheel is offset from the control arm in the lateral direction.

11. The robot of claim 1, wherein the biasing member comprises a spring.

12. The robot of claim 1, wherein the support system comprises first, second, third, and fourth support wheels.

13. The robot of claim 1, wherein the support system comprises caster wheels.

14. The robot of claim 1, wherein a pivot axis of the control arm is generally parallel with an axis of rotation of the drive wheel.

15. The robot of claim 1, wherein a second end of the control arm moves in a generally vertical direction between a disengaged configuration and an engaged configuration.

16. The robot of claim 1, wherein the drivetrain comprises a worm gear and worm wheel.

17. The robot of claim 1, further comprising a second drive assembly on an opposite side of the chassis as the first drive assembly.

18. The robot of claim 17, wherein the first drive assembly and the second drive assembly are mounted on a single axle coupled with the chassis.

* * * * *